(12) United States Patent
Hayashi et al.

(10) Patent No.: US 8,620,562 B2
(45) Date of Patent: Dec. 31, 2013

(54) VARIABLE VALVE SYSTEM CONTROL APPARATUS

(75) Inventors: Kota Hayashi, Nagoya (JP); Tokiji Ito, Toyota (JP); Fumito Takimoto, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 246 days.

(21) Appl. No.: 13/005,769

(22) Filed: Jan. 13, 2011

(65) Prior Publication Data

US 2011/0192364 A1 Aug. 11, 2011

(30) Foreign Application Priority Data

Feb. 8, 2010 (JP) ................................. 2010-025284

(51) Int. Cl.
*G06F 17/00* (2006.01)

(52) U.S. Cl.
USPC ........................................ 701/103; 123/90.15

(58) Field of Classification Search
USPC ......... 701/103–105, 114; 123/321–323, 90.1, 123/90.12, 90.13, 90.15
See application file for complete search history.

(56) References Cited

U.S. PATENT DOCUMENTS

| 2001/0052331 | A1 | 12/2001 | Nakamura |
| 2002/0139329 | A1 | 10/2002 | Machida |
| 2006/0016407 | A1* | 1/2006 | Miyanoo et al. ............ 123/90.15 |
| 2006/0090730 | A1* | 5/2006 | Yui ................................ 123/346 |
| 2006/0266311 | A1* | 11/2006 | Fujii ........................... 123/90.15 |
| 2007/0006832 | A1 | 1/2007 | Kang et al. |
| 2009/0292451 | A1* | 11/2009 | Murai et al. ................... 701/105 |

FOREIGN PATENT DOCUMENTS

| DE | 101 28 622 A1 | 1/2002 |
| DE | 10 2006 030 324 A1 | 2/2007 |
| EP | 1 234 970 A2 | 8/2002 |
| EP | 1 617 048 A1 | 1/2006 |
| JP | 2002-250246 A | 9/2002 |
| JP | 2002-285871 A | 10/2002 |
| JP | 2005-106023 A | 4/2005 |
| JP | 2006-029159 A | 2/2006 |
| JP | 2008-286165 A | 11/2008 |
| JP | 2009-085147 A | 4/2009 |

* cited by examiner

*Primary Examiner* — John Kwon
*Assistant Examiner* — Johnny Hoang
(74) *Attorney, Agent, or Firm* — Sughrue Mion, PLLC

(57) ABSTRACT

A control apparatus of a variable valve system includes a variable valve timing mechanism that performs variable control of the valve timing of an intake valve of an internal combustion engine, a variable operation angle mechanism that performs variable control of the operation angle of the intake valve, and a control unit that performs drive control of the variable valve timing mechanism and the variable operation angle mechanism. The control unit sets an upper guard for the operation angle according to an actual value of the valve timing, and when a target value of the valve timing is a value on the retard side of a specified determining value, the control unit reinforces the upper guard compared with when the target value of the valve timing is not a value on the retard side of the specified determining value.

10 Claims, 5 Drawing Sheets

VARIABLE VALVE SYSTEM CONTROL APPARATUS

INCORPORATION BY REFERENCE

The disclosure of Japanese Patent Application No. 2010-025284 filed on Feb. 8, 2010 including the specification, drawings and abstract is incorporated herein by reference in its entirety.

BACKGROUND OF THE INVENTION

1. Field of the Invention

The invention relates to a control apparatus of a variable valve system that performs variable control of valve timing of intake and exhaust valves in an internal combustion engine, and variable control of the operation angle of those valves.

2. Description of the Related Art

In recent years, variable valve systems that vary the valve characteristics of intake and exhaust valves have been put into practical use as systems applied to internal combustion engines mounted in vehicles and the like. In internal combustion engines that employ such variable valve systems, performance with regard to engine output, fuel efficiency, and emissions and the like is improved by appropriately adjusting the valve characteristics of the intake and exhaust valves according to the operating state of the engine.

Also in recent years, variable valve systems that perform variable control of both the valve timing and the operation angle of the intake valves have also been put into practical use. In such variable valve systems, the valve closing timing of the intake valves will be earlier if the operation angle is increased and the valve timing remains fixed, and the valve opening timing of the intake valves will be later if the operation angle is decreased and the valve timing remains fixed. Therefore, in such variable valve systems, the valve timing of the intake valves is retarded according to the increase in the operation angle, such that the valve opening timing of the intake valves does not become too early or too late according to a change in the operation angle. Therefore, the valve lift curve of the intake valves in an internal combustion engine that employs such a variable valve system varies generally in the manner shown in FIG. 6.

Also, in such a variable valve system, if the operation angle is increased while the valve timing is advanced and the center of lift of the intake valve (i.e., the point at which the intake valve is fully open) is near top dead center (TDC) of the piston, the piston and intake valve may interfere with one another and so-called valve stamp may occur. In order to avoid valve stamp, the valve timing of the intake valve is also retarded according to the increase in the operation angle.

FIG. 7 is a view illustrating the relationship between the valve timing and the operation angle of an intake valve in such a variable valve system. The region indicated by hatching in the drawing is an interference region A where valve stamp occurs. Therefore, with a variable valve system such as that described above, the control range of the valve timing and the operation angle is limited to the region other than the interference region A, i.e., the non-interference region.

Incidentally, even if an attempt is made to control the valve timing and the operation angle in the non-interference region, there is a probability that the valve timing and the operation angle will temporarily enter the interference region A in a certain transient state while they shift toward their target values. For example, the valve timing and the operation angle may enter the interference region A if the valve timing is retarded late with respect to an increase in the operation angle or if the operation angle is reduced late with respect to the advancing of the valve timing.

Therefore, Japanese Patent Application Publication No. 2006-029159 (JP-A-2006-029159) proposes a control apparatus of a variable valve system as technology that attempts to more reliably avoid valve stamp. The control apparatus described in JP-A-2006-029159 estimates the valve timing and reduces the operation angle when the estimated value exceeds a predetermined value. That is, the control apparatus described in JP-A-2006-029159 sets a critical curve C somewhat below a boundary B between the interference region A and the non-interference region in FIG. 7. When the point of intersection between the current operation angle and the estimated value of the valve timing crosses the critical curve C and enters the interference region A, a valve stamp avoidance operation that involves reducing the operation angle or retarding the valve timing is executed.

In this kind of control apparatus of a variable valve system, valve stamp can reliably be avoided by setting the critical curve C far enough away from the interference region A. However, in order to be able to avoid valve stamp in all conceivable situations, the critical curve C must be set far away from the boundary B, so the control range of the valve timing and the operation angle ends up being limited by that amount. Incidentally, this problem may also occur in a variable valve system that performs variable control of both the valve timing and the operation angle of an exhaust valve as well.

SUMMARY OF THE INVENTION

The invention therefore provides a control apparatus of a variable valve system capable of ensuring a relatively wide operation angle control range while also being able to reliably avoid valve stamp.

In a variable valve system that performs variable control of the variable timing and the operation angle of an intake valve of an internal combustion engine, variable control of the valve timing and the operation angle is performed to generally retard the valve timing according to an increase in the operation angle. Therefore, when the operation angle is increased, a target value of the valve timing is set to a value on the retard side. If the actual value of the valve timing exceeds that target value and overshoots to the advance side in this state, the valve timing and the operation angle may enter an interference region where valve stamp occurs. In order to reliably avoid this, an upper guard for the operation angle must be set far enough away from the boundary between the interference region and the non-interference region. However, if the upper guard is given a lot of allowance, the control range of the valve timing and the operation angle will end up being reduced.

Thus, a first aspect of the invention relates to a control apparatus of a variable valve system. This control apparatus includes a variable valve timing mechanism that performs variable control of the valve timing of an intake valve of an internal combustion engine, a variable operation angle mechanism that performs variable control of the operation angle of the intake valve, and a control unit that performs drive control of the variable valve timing mechanism and the variable operation angle mechanism. The control unit sets an upper guard for the operation angle according to an actual value of the valve timing, and when a target value of the valve timing is a value on the retard side of a specified determining value, the control unit reinforces the upper guard compared with when the target value of the valve timing is not a value on the retard side of the specified determining value. With this control apparatus, the upper guard for the operation angle is reinforced, i.e., the upper guard is set farther away from (i.e., with a larger allowance with respect to) the boundary between the interference region and the non-interference region, only when the target value of the valve timing of the intake valve is set to a value on the retard side and it is highly likely that valve stamp will occur. On the other hand, under normal circumstances in which the target value of the valve timing of the intake valve is not set to a value on the retard side and it is not highly likely that valve stamp will occur, the upper guard is set closer to the boundary between the interference region and the non-interference region, i.e., the upper guard allowance is kept small. Therefore, according to this structure, a relatively wide operation angle control range can be ensured while valve stamp is also able to be reliably avoided.

Incidentally, in a variable valve system that performs variable control of both the valve timing and the operation angle of an exhaust valve of an internal combustion engine, variable control of the valve timing and the operation angle is performed to generally advance the valve timing according to an increase in the operation angle. Therefore, when the operation angle of the exhaust valve is increased, a target value of that valve timing is set to a value on the advance side.

A second aspect of the invention relates to a control apparatus of a variable valve system. This control apparatus includes a variable valve timing mechanism that performs variable control of the valve timing of an exhaust valve of an internal combustion engine, a variable operation angle mechanism that performs variable control of the operation angle of the exhaust valve, and a control unit that performs drive control of the variable valve timing mechanism and the variable operation angle mechanism. The control unit sets an upper guard for the operation angle according to an actual value of the valve timing, and when a target value of the valve timing is a value on the advance side of a specified determining value, the control unit reinforces the upper guard compared with when the target value of the valve timing is not a value on the advance side of the specified determining value. With this structure, the upper guard for the operation angle is reinforced, i.e., the upper guard is set farther away from (i.e., with a larger allowance with respect to) the boundary between the interference region and the non-interference region, only when the target value of the valve timing of the exhaust valve is set to a value on the advance side and it is highly likely that valve stamp will occur. On the other hand, under normal circumstances in which the target value of the valve timing of the exhaust valve is not set to a value on the advance side and it is not highly likely that valve stamp will occur, the upper guard is set closer to the boundary between the interference region and the non-interference region, i.e., the upper guard allowance is kept small. Therefore, according to this structure, a relatively wide operation angle control range can be ensured while valve stamp is also able to be reliably avoided.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, a control apparatus of a variable valve system according to a first example embodiment of the invention will be described in detail with reference to FIGS. 1 to 4.

Figure 1:
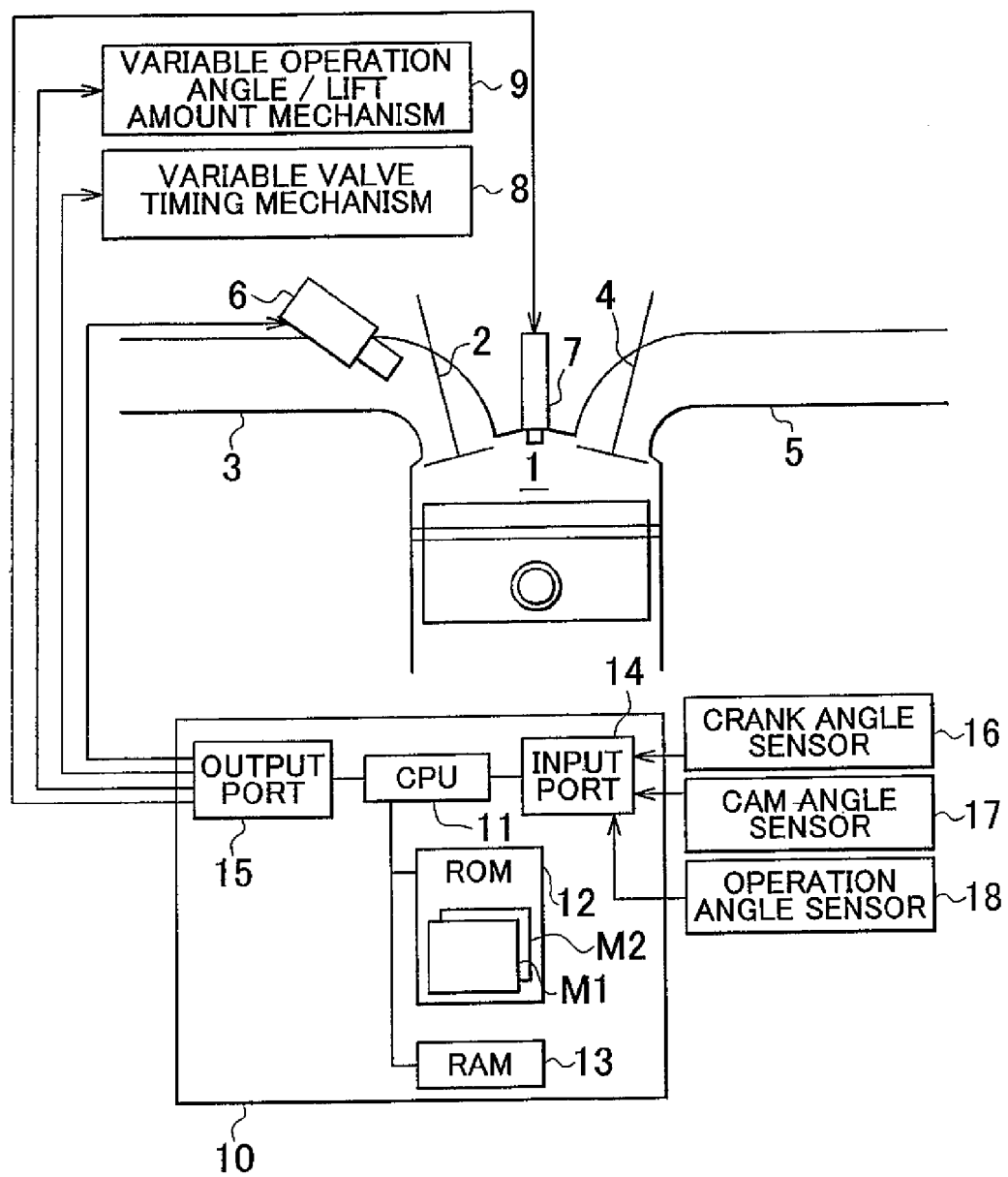
FIG. 1 is a schematic view of the overall structure of a first example embodiment of the invention.

FIG. 1 is a view of the structure of an internal combustion engine, and the control system thereof, to which the control apparatus of a variable valve system according to a first example embodiment of the invention may be applied. A combustion chamber 1 of the internal combustion engine to which this example embodiment is applied is connected to an intake pipe 3 via an intake valve 2, and connected to an exhaust pipe 5 via an exhaust valve 4. The intake pipe 3 is provided with an injector 6 that injects fuel into intake air that flows through the intake pipe 3. Also, the combustion chamber 1 is provided with a spark plug 7 that ignites the mixture of air and fuel introduced into the combustion chamber 1.

A valve system of the intake valve 2 of this internal combustion engine is provided with a variable valve timing mechanism 8 that varies the valve timing of the intake valve 2. The valve system of the intake valve 2 is also provided with a variable operation angle/lift amount mechanism 9 that varies the operation angle and lift amount of the intake valve 2.

The internal combustion engine structured as described above is controlled by an electronic control unit (ECU) 10. This ECU 10 includes a central processing unit (CPU) 11, read-only memory (ROM) 12, random access memory (RAM) 13, an input port 14, and an output port 15. The CPU 11 executes various calculations related to engine control. Programs and data for engine control are stored in the ROM 12, and the calculation results of the CPU 11 and detection results from sensors are temporarily stored in the RAM 13.

The ECU 10 receives detection data via the input port 14 from sensors located in various parts of the vehicle. For example, the ECU 10 receives via the input port 14 detection data from a crank angle sensor 16 that outputs a pulse signal every time a crankshaft rotates a predetermined number of degrees, and a cam angle sensor 17 that outputs a signal when an intake camshaft reaches a specified rotation angle. The ECU 10 also receives via the input port 14 detection data from an operation angle sensor 18 that detects the operation angle of the intake valve 2 from the operating position of the variable operation angle/lift amount mechanism 9. Incidentally, the ECU 10 checks the valve timing of the intake valve 2 from the detection data of the crank angle sensor 16 and the cam angle sensor 17. Incidentally, the valve timing of the intake valve 2 is expressed as the advance amount [crank angle] from the most retarded position within the range within which the valve timing can be varied by the variable valve timing mechanism 8.

On the other hand, the ECU 10 outputs commands to various parts of the vehicle via the output port 15. For example, the ECU 10 outputs a command to the drive circuits of the injector 6, the spark plug 7, the variable valve timing mechanism 8, and the variable operation angle/lift amount mechanism 9 and the like via the output port 15.

In the example embodiment structured as described above, the ECU 10 calculates a target value for the valve timing and a target value for the operation angle of the intake valve 2 that are optimal for the current engine operating state while the engine is operating. That is, the ECU 10 calculates a target valve timing and a target operation angle. Then the ECU 10 controls the valve characteristics of the intake valve 2 by outputting a command indicative of the calculated target valve timing to the drive circuit of the variable valve timing mechanism 8 and a command indicative of the calculated target operation angle to the drive circuit of the variable operation angle/lift amount mechanism 9. The control of the valve characteristics here is largely performed to retard the valve timing according to an increase in the operation angle.

Incidentally, when calculating the target operation angle, the ECU 10 sets an upper guard for the target operation angle according to the actual value of the valve timing obtained from the detection data of the crank angle sensor 16 and the cam angle sensor 17, i.e., according to the actual valve timing, thereby avoiding valve stamp.

Here in this example embodiment, the ECU 10 is provided with two guard maps, i.e., a first guard map M1 and a second guard map M2, as maps indicating ranges of the upper guard for the operation angle. These guard maps M1 and M2 are stored in the ROM 12 of the ECU 10. The ECU 10 switches the guard map M1 or M2 that is used, according to the value of the target valve timing at that time.

Figure 2:
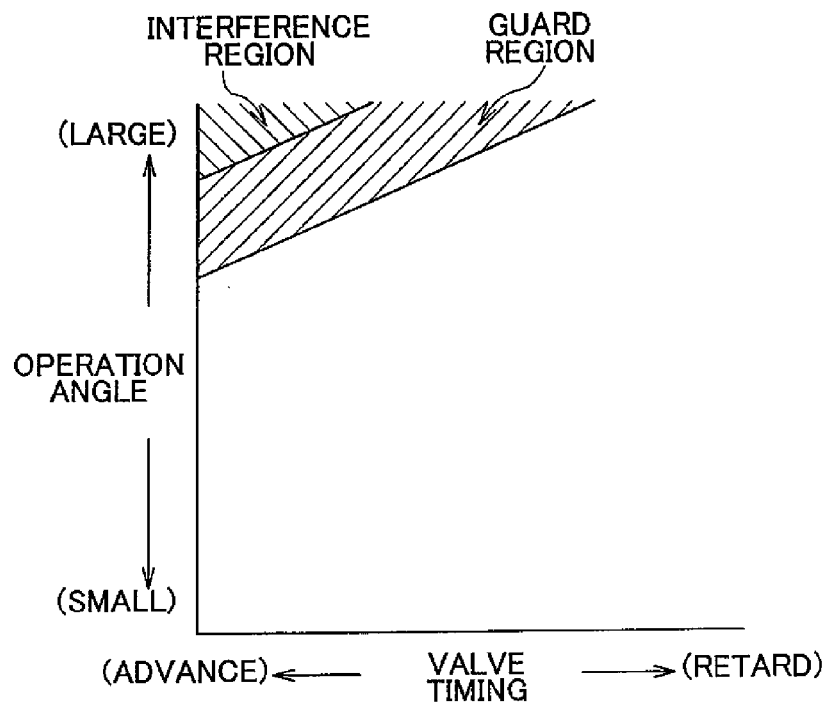
FIG. 2 is a graph showing how a first guard map employed in the first example embodiment is set.
Figure 3:
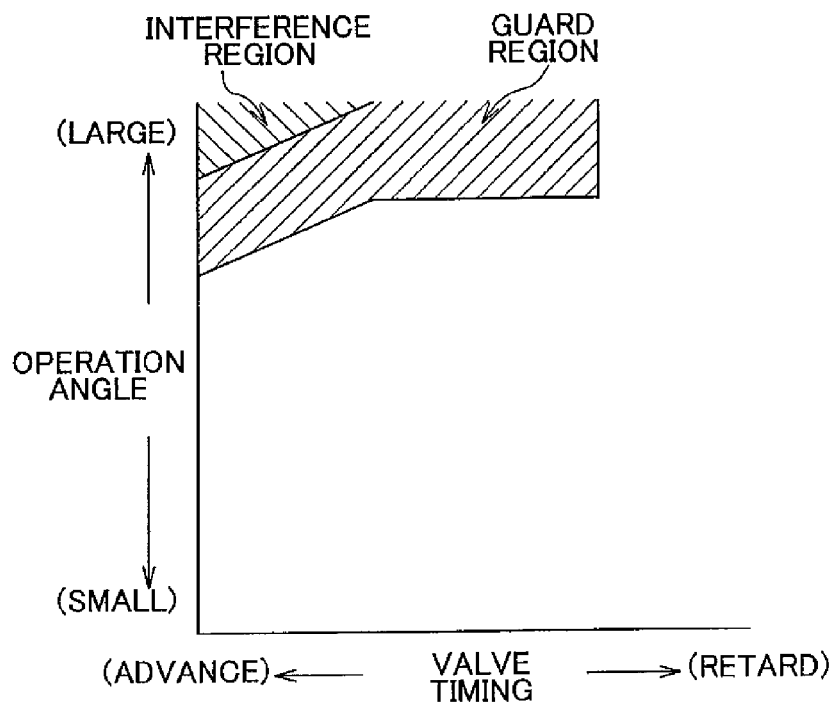
FIG. 3 is a graph showing how a second guard map employed in the first example embodiment is set.

FIG. 2 is a view showing how the first guard map M1 is set, and FIG. 3 is a view showing how the second guard map M2 is set. As is evident from comparing these maps, the range of the upper guard of the target operation angle is wider in the second guard map M2 than it is in the first guard map M1.

Here, when the target valve timing is a value on the retard side, the operation angle is increased so it is highly likely that valve stamp will occur. Therefore when the target valve timing is a value that is on the retard side of a specified determining value $\alpha$, the ECU 10 uses the second guard map M2 with the larger operation angle upper guard range, and when the target valve timing is not a value that is on the retard side of the specified determining value $\alpha$, the ECU 10 uses the first guard map M1 with the smaller operation angle upper guard range. That is, in this example embodiment, the upper guard of the operation angle is reinforced when the target valve timing is a value on the retard side of the determining value $\alpha$ compared with when the target valve timing is not a value on the retard side of the determining value $\alpha$. Incidentally, the phrase "the upper guard of the operation angle is reinforced" in this specification refers to the upper guard range of the operation angle being wider. In this way, a relatively wide operation angle control range is ensured while being able to reliably avoid valve stamp by reinforcing the operating angle upper guard only when it is highly likely that valve stamp will occur.

Figure 4:
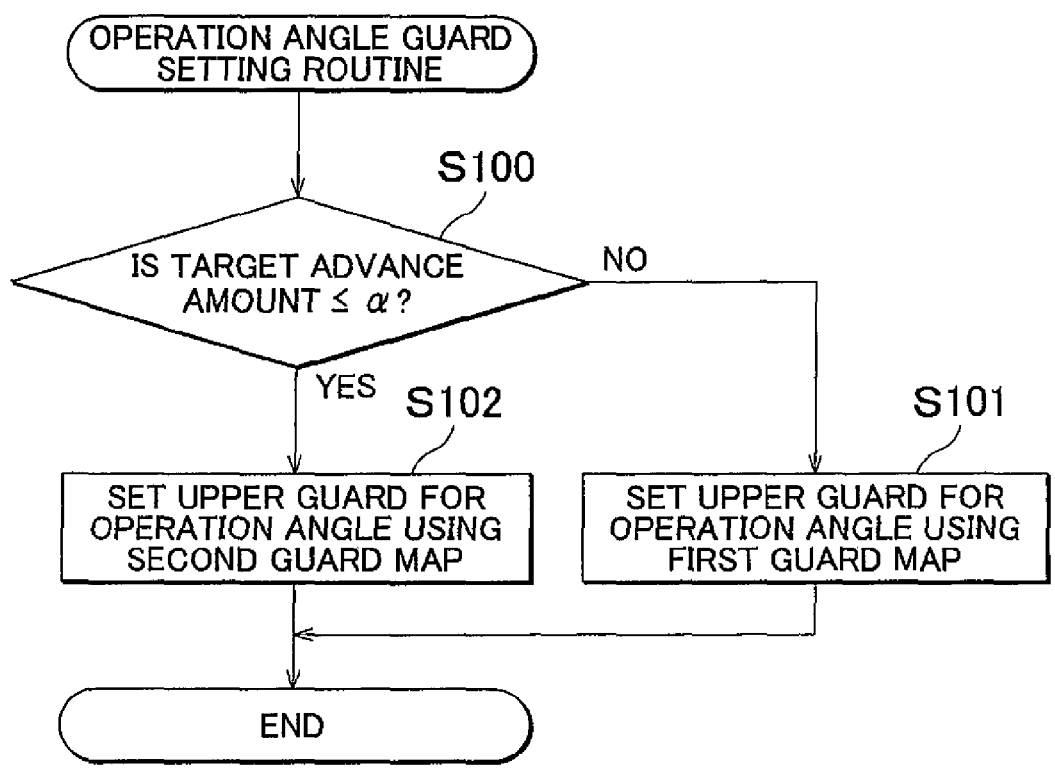
FIG. 4 is a flowchart of an operation angle upper guard setting routine employed in the first example embodiment.

FIG. 4 is a flowchart of an operation angle upper guard setting routine applied to this example embodiment. The routine in this flowchart is repeatedly executed in cycles by the ECU 10 while the engine is operating.

At the start of the routine, the ECU 10 first determines in step S100 whether the target valve timing of the intake valve 2 is a value on the retard side of the determining value $\alpha$, i.e., whether a target advance amount of the valve timing is equal to or less than the determining value $\alpha$. If it is determined here that the target advance amount of the valve timing is greater than the determining value $\alpha$ (i.e., NO in step S100), then in step S101 the ECU 10 sets an upper guard for the operation angle using the first guard map M1 with the smaller operation angle upper guard range. If, on the other hand, the target advance amount of the valve timing is equal to or less than the determining value $\alpha$ (i.e., YES in step S100), then in step S102 the ECU 10 sets an upper guard for the operation angle using the second guard map M2 with the larger operation angle upper guard range.

The control apparatus of a variable valve system according to the example embodiment described above is able to yield the effects described below.

(1) In this example embodiment, an upper guard of an operation angle is set according to the actual valve timing, and that upper guard is reinforced when the target valve timing is a value on the retard side of the specified determining value $\alpha$ compared with when the target valve timing is not a value on the retard side of the determining value $\alpha$. In this example embodiment, the upper guard for the operation angle is reinforced, i.e., the upper guard is set farther away from (i.e., with a larger allowance with respect to) the boundary between the interference region and the non-interference region, only when the target valve timing of the intake valve 2 is set to a value on the retard side and it is highly likely that valve stamp will occur. On the other hand, under normal circumstances in which the target valve timing of the intake valve 2 is not set to a value on the retard side and it is not highly likely that valve stamp will occur, the upper guard allowance is kept small. Therefore, according to this example embodiment, a relatively wide operation angle control range can be ensured, while valve stamp is also able to be reliably avoided.

Next, a control apparatus of a variable valve system according to a second example embodiment of the invention will be described in detail with reference to FIG. 5. Incidentally, in this second example embodiment, structure that is the same as that in the first example embodiment described above will be denoted by like reference characters and detailed descriptions of that structure will be omitted.

In the variable valve system described above, even if the target operation angle is increased and the target valve timing is retarded according to that increase, there is a response lag so it takes some time until the operation angle actually increases. Therefore, the probability of valve stamp occurring actually becomes high after a fixed period of time has passed after the target valve timing of the intake valve 2 is retarded. Thus, in this example embodiment, the upper guard is reinforced on the condition that the time that has passed after the target valve timing has become a value on the retard side of the determining value $\alpha$ exceed a preset value $\gamma$. As a result, the control range is further inhibited from being reduced by the upper guard of the operation angle for avoiding valve stamp.

On the other hand, when the actual valve timing of the intake valve 2 is on the advance side of the target valve timing, the valve timing shifts to the retard side. That is, the valve timing of the intake valve 2 at this time makes a transition to the safer side with regard to valve stamp. Therefore, even if the target value of the valve timing of the intake valve 2 is retarded, valve stamp is able to be avoided without reinforcing the upper guard when the actual value is a value on the advance side to a certain degree. Therefore, in this example embodiment, the control range is further inhibited from being reduced by the upper guard of the operation angle for avoiding valve stamp, by reinforcing the upper guard on the condition that the actual valve timing be a value on the retard side of a preset value $\beta$.

Also, similarly, if the actual value of the valve timing of the intake valve 2 is shifting to the advance side, that valve timing will make a transition to the safer side with regard to valve stamp. Therefore, even if the target valve timing of the intake valve 2 is retarded, valve stamp is able to be avoided without reinforcing the upper guard if the actual valve timing is shifting to the retard side. Therefore, in this example embodiment, the control range is further inhibited from being reduced by the upper guard of the operation angle for avoiding valve stamp, by reinforcing the upper guard on the condition that the actual valve timing be shifting to the advance side.

Figure 5:
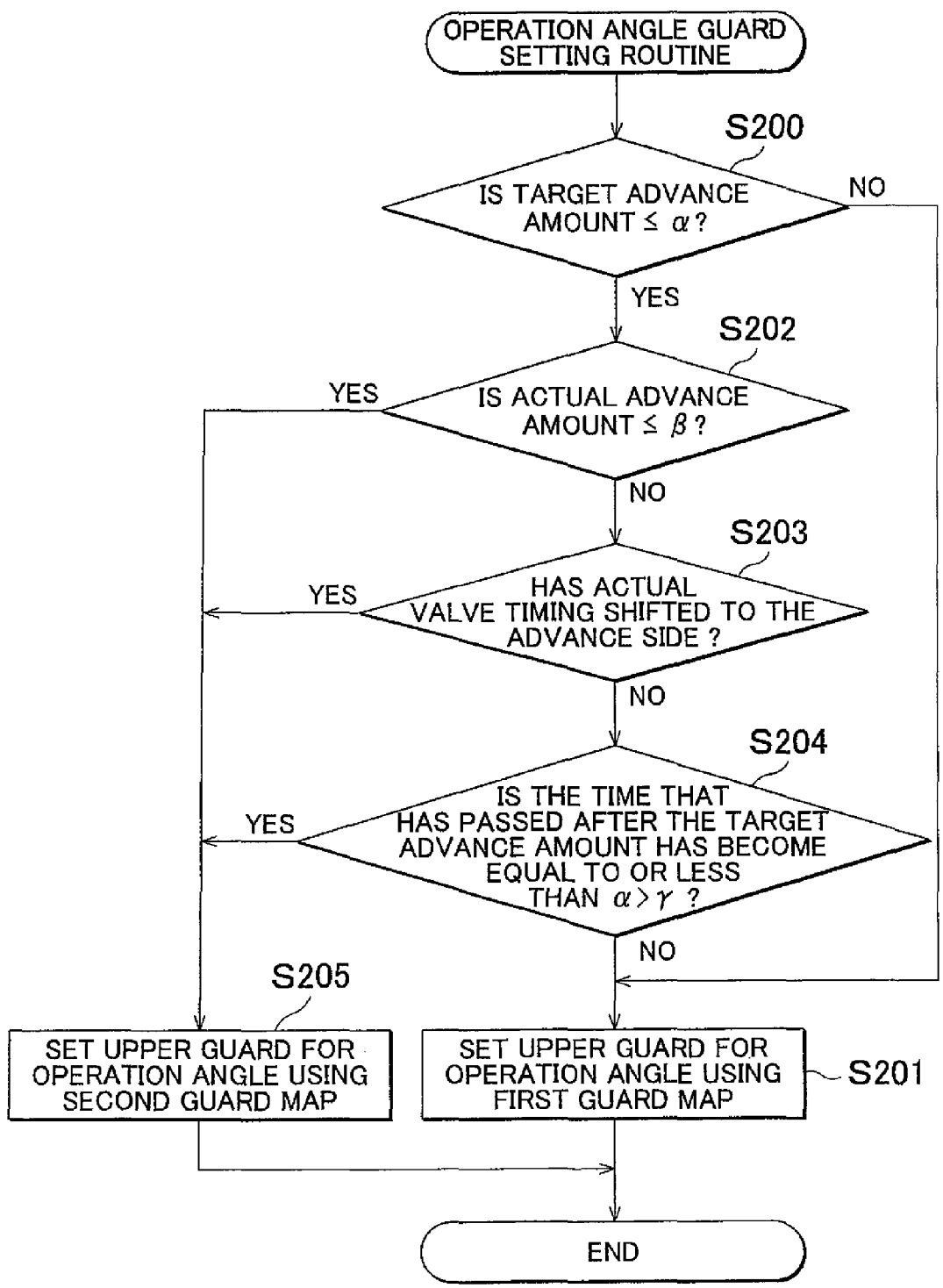
FIG. 5 is a flowchart of an operation angle upper guard setting routine employed in a second example embodiment of the invention.
Figure 6:
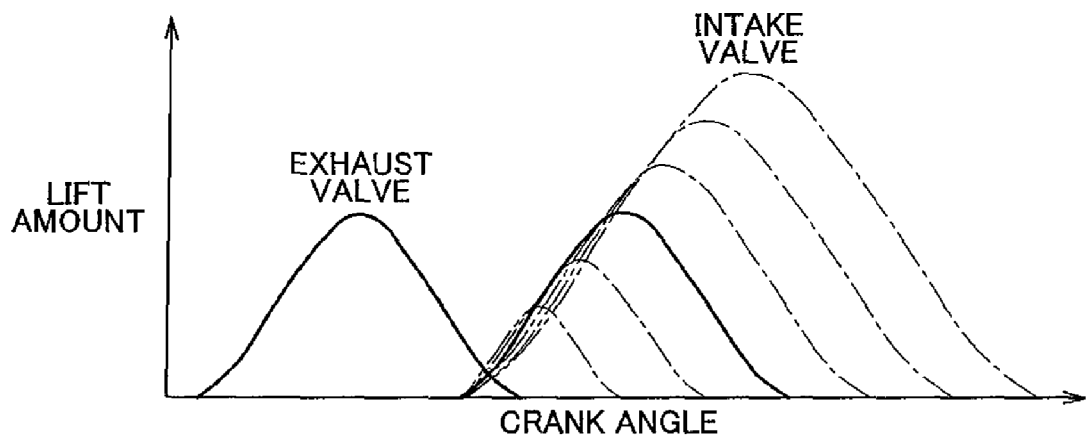
FIG. 6 is a graph showing an outline of how the valve lift curve varies in a variable valve system that performs variable control on both the valve timing and the operation angle of an intake valve.
Figure 7:
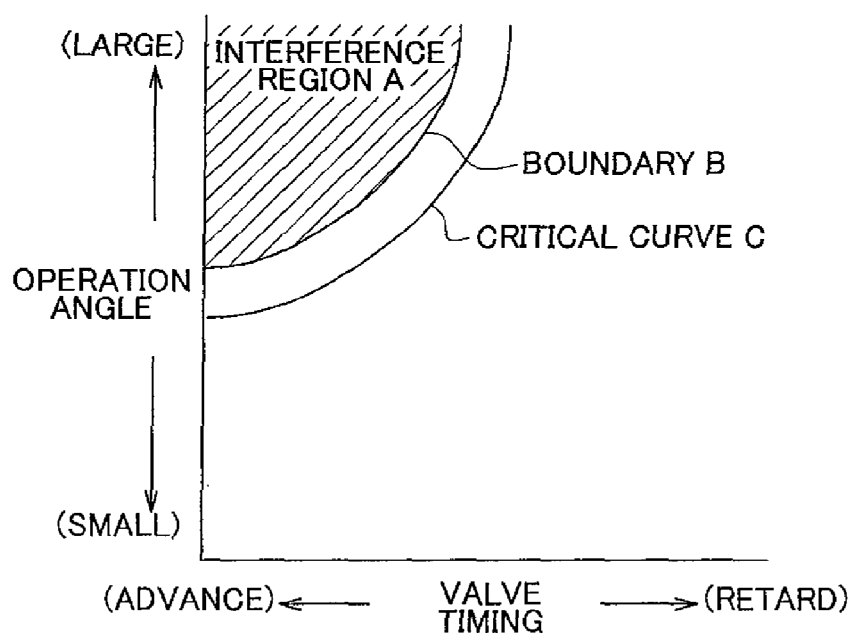
FIG. 7 is a graph showing the relationship between an interference region and a critical curve of a variable valve system according to related art.

FIG. 5 is a flowchart illustrating an operation angle upper guard setting routine applied to this example embodiment. The routine in this flowchart is repeatedly executed in cycles by the ECU 10 while the engine is operating.

At the start of the routine, the ECU 10 first determines in step S200 whether the target valve timing of the intake valve 2 is a value on the retard side of the determining value $\alpha$, i.e., whether a target advance amount of the intake valve 2 is equal to or less than the determining value $\alpha$. If it is determined here that the target advance amount is greater than the determining value $\alpha$ (i.e., NO in step S200), then in step S201 the ECU 10 sets an upper guard for the operation angle using the first guard map M1 with the smaller operation angle upper guard range.

If, on the other hand, the target advance amount of the intake valve 2 is equal to or less than the determining value $\alpha$ (i.e., YES in step S200), then the ECU 10 performs steps S202 to S204. That is, in step S202 the ECU 10 determines whether the actual valve timing of the intake valve 2 is a value on the retard side of the preset value $\beta$, i.e., whether the actual advance amount of the intake valve 2 is equal to or less than the preset value $\beta$. Also, in step S203, the ECU 10 determines whether the actual valve timing of the intake valve 2 is shifting to the advance side. Further, in step S204, the ECU 10 determines whether the time that has passed after the target advance amount of the intake valve 2 has become equal to or less than the preset value $\alpha$ has exceeded the preset value $\gamma$. If the determination in any one of steps S202 to S204 is yes, the ECU 10 then sets the upper guard for the operation angle using the second guard map M2 with the larger operation angle upper guard range in step S205. If, on the other hand, the determinations in all of steps S202 to S204 are no, the ECU 10 assumes that the probability of valve stamp occurring is low and therefore sets the upper guard for the operation angle using the first guard map M1 with the smaller operation angle upper guard range in step S201.

This example embodiment is able to yield the effects described below in addition to the effect described in (1) above.

(2) In this example embodiment, the upper guard for the operation angle is reinforced on the condition that the time that has passed after the target valve timing has become a value on the retard side of the determining value $\alpha$ exceed the preset value $\gamma$. Even if the target operation angle is increased and the target valve timing of the intake valve 2 is retarded according to that increase, there is a response lag so it takes some time until the operation angle actually increases. Therefore, the probability of valve stamp occurring actually becomes high after a fixed period of time has passed after the target value of the valve timing of the intake valve 2 is retarded. Thus, in this example embodiment, the upper guard is reinforced only when the probability of valve stamp occurring is truly high, so the control range can be further inhibited from being reduced by the upper guard of the operation angle for avoiding valve stamp.

(3) In this example embodiment, the upper guard of the operation angle is reinforced on the condition that the actual valve timing be a value on the retard side of the preset value $\beta$. The valve timing shifts to the retard side when the actual valve timing of the intake valve 2 is on the advance side of the target valve timing. That is, the valve timing of the intake valve 2 at this time makes a transition to the safer side with regard to valve stamp. Accordingly, even if the target value of the valve timing of the intake valve 2 is retarded, valve stamp is able to be avoided without reinforcing the upper guard if that actual value is a value on the advance side to some degree. Therefore, in this example embodiment, the upper guard is reinforced only when the probability of valve stamp occurring is truly high, so the control range can be further inhibited from being reduced by the upper guard of the operation angle for avoiding valve stamp.

(4) In this example embodiment, the upper guard of the operation angle is reinforced on the condition that the actual valve timing be shifting to the advance side. If the actual valve timing of the intake valve 2 is shifting to the advance side, that valve timing will make the transition to the safer side with regard to valve stamp. Accordingly, even if the target valve timing of the intake valve 2 is retarded, valve stamp is able to be avoided without reinforcing the upper guard if the actual valve timing is shifting to the retard side. Therefore, in this example embodiment, the upper guard is reinforced only when the probability of valve stamp occurring is truly high, so the control range can be further inhibited from being reduced by the upper guard of the operation angle for avoiding valve stamp.

Next, a case in which the invention is applied to a variable valve system of an exhaust valve will be described. With a variable valve system that varies the valve timing and operation angle of an exhaust valve, valve stamp may occur if the operation angle is increased while the valve timing of the exhaust valve is retarded. Also, in such a variable valve system, normally, variable control of the valve characteristics is performed to advance the valve timing of the exhaust valve according to an increase in the operation angle.

Therefore, with this variable valve system, in step S100 in FIG. 4 and step S200 in FIG. 5, it is determined whether the target valve timing of the exhaust valve is a value on the advance side of a specified determining value, i.e., whether a target retard amount of the exhaust valve is equal to or less than a determining value. Also, in step S202 in FIG. 5, it is determined whether the actual valve timing of the exhaust valve is a value on the advance side of a preset value, i.e., whether an actual retard amount of the exhaust valve is equal to or less than a preset value. Moreover, in step S203 in FIG. 5, it is determined whether the actual valve timing of the exhaust valve is shifting to the retard side, and in step S204 in FIG. 5, it is determined whether the time that has passed after the target valve timing of the exhaust valve has become a value on the advance side of the determining value has exceeded a preset value.

Incidentally, the example embodiments described above may also be modified as described below.

One or two of the determination of steps S202 to S204 in the operation angle upper guard setting routine in the second example embodiment may be omitted. Even in this case, the control range is still inhibited to some degree from being reduced by the operation angle upper guard for avoiding valve stamp.

The variable operation angle/lift amount mechanism 9 in the example embodiments described above performs variable control that varies both the operation angle and the lift amount. Alternatively, however, the invention may similarly be applied to a variable valve system in which that variable mechanism varies the operation angle but keeps the lift amount fixed.

What is claimed is:

1. A control apparatus of a variable valve system, comprising:
   a variable valve timing mechanism that performs variable control of the valve timing of an intake valve of an internal combustion engine;
   a variable operation angle mechanism that performs variable control of the operation angle of the intake valve; and
   an electronic control unit, including executable program logic, configured to perform:
   controlling the variable valve timing mechanism and the variable operation angle mechanism,
   setting an upper guard for the operation angle according to an actual value of the valve timing, and
   when a target value of the valve timing is a value on a retard side of a specified determining value, reinforcing the upper guard compared with when the target value of the valve timing is not a value on the retard side of the specified determining value.

2. The control apparatus according to claim 1, wherein the upper guard is reinforced on a condition that the time that has passed after the target value of the valve timing has become the value on the retard side of the specified determining value exceed a first preset value.

3. The control apparatus according to claim 1, wherein the upper guard is reinforced on a condition that the actual value of the valve timing be the value on the retard side of a second preset value.

4. The control apparatus according to claim 1, wherein the upper guard is reinforced on a condition that the actual value of the valve timing be shifting to an advance side.

5. A control apparatus of a variable valve system, comprising:
   a variable valve timing mechanism that performs variable control of the valve timing of an exhaust valve of an internal combustion engine;
   a variable operation angle mechanism that performs variable control of the operation angle of the exhaust valve; and
   an electronic control unit, including executable program logic, configured to perform:
   controlling the variable valve timing mechanism and the variable operation angle mechanism,
   setting an upper guard for the operation angle according to an actual value of the valve timing, and
   when a target value of the valve timing is a value on an advance side of a specified determining value, reinforcing the upper guard compared with when the target value of the valve timing is not a value on the advance side of the specified determining value.

6. The control apparatus according to claim 5, wherein the upper guard is reinforced on a condition that the time that has passed after the target value of the valve timing has become the value on the advance side of the specified determining value exceed a first preset value.

7. The control apparatus according to claim 5, wherein the upper guard is reinforced on a condition that the actual value of the valve timing be the value on the advance side of a second preset value.

8. The control apparatus according to claim 5, wherein the upper guard is reinforced on a condition that the actual value of the valve timing be shifting to a retard side.

9. The control apparatus according to claim 1, wherein:
   the electronic control unit includes, as maps indicating ranges of the upper guard, a first guard map with a smaller upper guard range and a second guard map with a larger upper guard range; and
   the electronic control unit is further configured to perform reinforcing the upper guard by switching a map that is referenced when setting the upper guard from the first guard map to the second guard map.

10. The control apparatus according to claim 5, wherein:
    the electronic control unit includes, as maps indicating ranges of the upper guard, a first guard map with a smaller upper guard range and a second guard map with a larger upper guard range; and
    the electronic control unit is further configured to perform reinforcing the upper guard by switching a map that is referenced when setting the upper guard from the first guard map to the second guard map.

* * * * *